(12) United States Patent
Zacher et al.

(10) Patent No.: US 10,741,885 B2
(45) Date of Patent: Aug. 11, 2020

(54) AUTONOMOUS INTERCONNECTION OF A DRIVE BATTERY

(71) Applicant: Dr. Ing. h.c. F. Porsche Aktiengesellschaft, Stuttgart (DE)

(72) Inventors: Marcus Zacher, Sindelfingen (DE); Marc Patt, Steinheim (DE); Thomas Fritz, Löchgau (DE)

(73) Assignee: Dr. Ing. h.c. F. Porsche Aktiengesellschaft (DE)

(*) Notice: Subject to any disclaimer, the term of this patent is extended or adjusted under 35 U.S.C. 154(b) by 0 days.

(21) Appl. No.: 16/127,425

(22) Filed: Sep. 11, 2018

(65) Prior Publication Data

US 2019/0106011 A1 Apr. 11, 2019

(30) Foreign Application Priority Data

Oct. 10, 2017 (DE) .................. 10 2017 123 458

(51) Int. Cl.
*H02J 7/00* (2006.01)
*H01M 10/44* (2006.01)
*B60L 53/36* (2019.01)

(52) U.S. Cl.
CPC .......... *H01M 10/441* (2013.01); *B60L 53/36* (2019.02); *H02J 7/0024* (2013.01); *H02J 7/0027* (2013.01); *H02J 7/0068* (2013.01); *B60L 2210/14* (2013.01); *B60L 2240/547* (2013.01)

(58) Field of Classification Search
USPC ....................................... 320/117
See application file for complete search history.

(56) References Cited

U.S. PATENT DOCUMENTS

| 2012/0013303 | A1  | 1/2012  | Mera    |            |
|--------------|-----|---------|---------|------------|
| 2013/0106357 | A1* | 5/2013  | Girard  | H01M 10/441 |
|              |     |         |         | 320/126    |
| 2015/0348335 | A1* | 12/2015 | Ramanujam | G07C 5/006 |
|              |     |         |         | 701/23     |
| 2016/0006060 | A1* | 1/2016  | Kwon    | H01M 8/04395 |
|              |     |         |         | 429/442    |
| 2018/0009400 | A1* | 1/2018  | Lee     | B60R 16/03 |
| 2018/0029474 | A1* | 2/2018  | Berels  | B60L 58/21 |

FOREIGN PATENT DOCUMENTS

DE 102013102576 A1 9/2014

* cited by examiner

*Primary Examiner* — Samuel Berhanu
(74) *Attorney, Agent, or Firm* — RatnerPrestia

(57) ABSTRACT

A method for autonomously interconnecting at least two battery banks in a drive system of a motor vehicle, the drive system comprising at least one electric motor, at least two battery banks, at least one traction system which can be supplied with power by at least one battery bank, and at least one DC/DC converter which can be connected to at least one battery bank. The battery banks can be interconnected with one another in series and/or in parallel and at least one battery bank can be bridged, wherein, during autonomous operation of the motor vehicle, respective interconnection of the at least two battery banks is automatically carried out within the drive system, depending on a respective operating state of the motor vehicle.

7 Claims, 1 Drawing Sheet

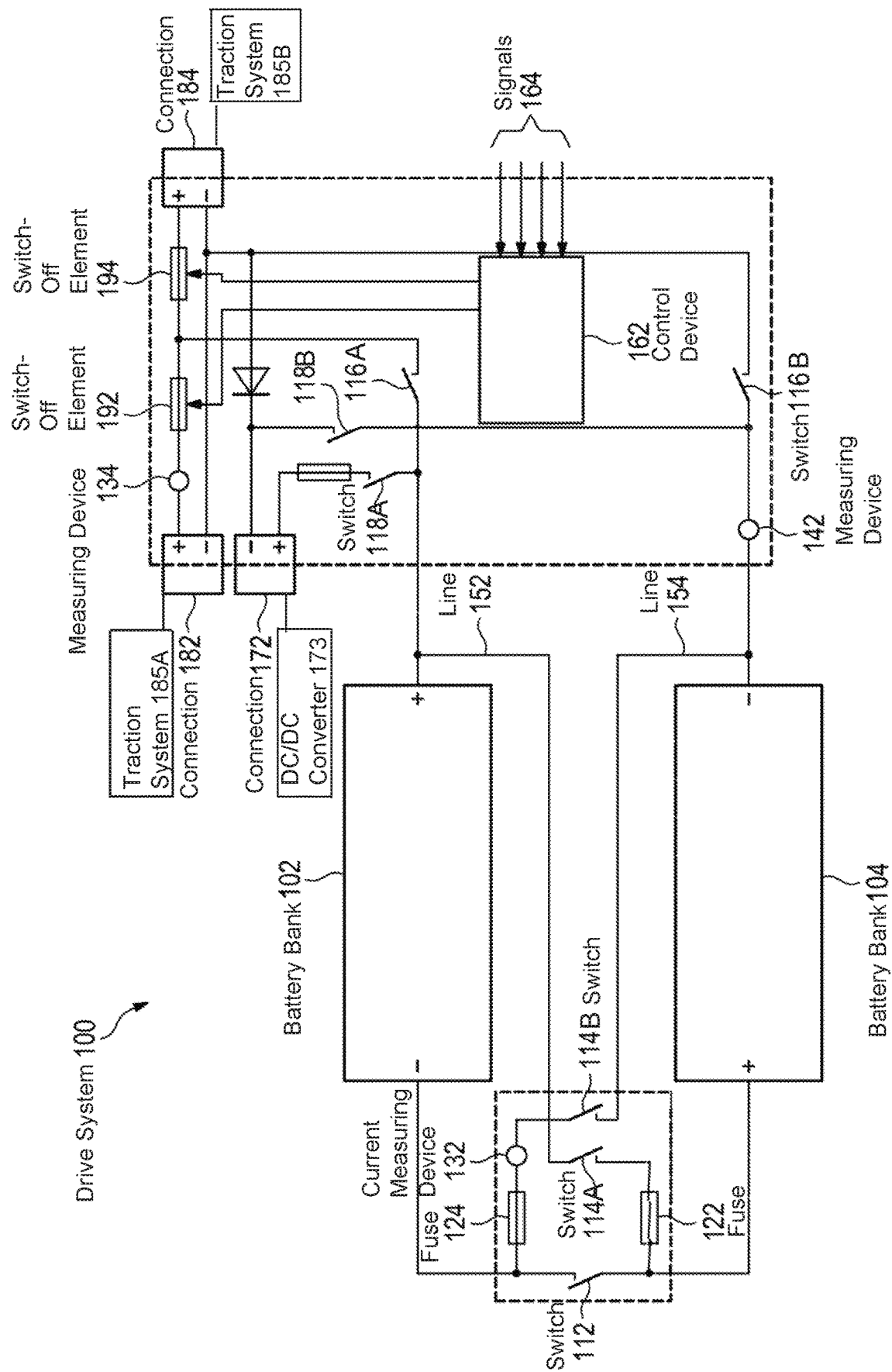

AUTONOMOUS INTERCONNECTION OF A DRIVE BATTERY

CROSS-REFERENCE TO RELATED APPLICATION

This application claims priority to German Patent Application No. DE 10 2017 123 458.6, filed Oct. 10, 2017, which is incorporated by reference herein in its entirety.

FIELD OF THE INVENTION

The present invention relates to a method and to a system for the purpose of autonomously interconnecting at least two battery banks in a drive system of a motor vehicle in the vehicle-internal power supply system, in which the at least two battery banks can be switched over to form a high-voltage battery.

BACKGROUND OF THE INVENTION

Autonomous driving of a motor vehicle means driving of the motor vehicle independently of a driver to different extents. A distinction is drawn between up to six stages, rising in level of autonomy of the motor vehicle, wherein the lowermost stage still comprises pure operator control by the driver and the topmost stage no longer requires any intervention by a driver at all. Starting from a stage which is identified as high-level automation, driving which is executed largely autonomously by the motor vehicle is assumed. Important functions, such as, for example, a traction system which, in the case of an electric vehicle, comprises, for example, an electric motor, a line system which carries power to said electric motor, and a drive battery, are autonomously monitored for the purpose of operating the motor vehicle.

Electric vehicles which are customary at present, including electric hybrid vehicles and battery-electric vehicles, have a drive voltage of up to 400 V. Accordingly, without limiting the generality, a high-voltage battery which is carried in the vehicle as an energy supply, generally a battery in the form of a certain number of secondary cells which are connected in series, is designed for this voltage level. Charging stations which are accessible in public areas also provide a charging voltage of 400 V as standard. In contrast, it is generally advantageous to work with voltages of, for example, 800 V or even 1200 V in electric utility vehicles, sports cars and racing vehicles in order to provide a required drive power of more than 250 kW. In order to save on weight due to switching systems which would first have to raise an on-board voltage to a level of this kind, it is advantageous to likewise operate a high-voltage battery in this voltage range. However, this in turn requires switching systems which step up the voltage of 400 V provided by the charging stations to the voltage of the high-voltage battery. In the prior art, this is achieved by voltage converters and, in particular, DC/DC converters, so-called DC/DC boosters, which establish a desired voltage level, for example of the high-voltage battery at 800 V, from a prespecified voltage level, for example of the charging station at 400 V.

Furthermore, it is possible in the prior art to connect the secondary cells of a battery in parallel in a plurality of groups, down to an actuation of an individual cell. The voltage level is therefore lower than would result from a total voltage of all of the secondary cells being connected in series. A method of this kind is disclosed in document US 2013 0106 357 A1, which is incorporated by reference herein, in which series or parallel interconnection is controlled by means of use of one switching contactor for each respective group in accordance with a state of discharge of a respective group of secondary cells.

Dividing a battery into suitable groups of secondary elements on the basis of an available charge current is carried out in document US 2012 0013 303 A1, which is incorporated by reference herein, by a charging control unit, this in turn resulting in parallel connection of the groups and the use of electronic components with the abovementioned disadvantages.

The applicant themselves cite DE 10 2013 102 576 A1, which is, incorporated by reference herein, which brings into play the advantages of a multiple charge connection. Therefore, explicitly in the case of a high-voltage battery of 800 V, a charging process can be carried out more rapidly with two charge connections of 400 V, however two charging stations also have to be available for this purpose.

SUMMARY OF THE INVENTION

Against this background, one object of the present invention is to provide a method for charging a high-voltage battery at a charging station with a lower charging voltage than the operating voltage of the high-voltage battery, without the need for incorporating complex power-electronics components. A further object of the present invention is to provide a corresponding system for carrying out a method of this kind.

In order to solve the abovementioned problem, the invention proposes a method for autonomously electrically interconnecting at least two battery banks in a drive system of a motor vehicle, in which method the drive system comprises at least one electric motor, at least two battery banks, at least one traction system which can be supplied with electrical energy by at least one battery bank, and at least one DC/DC converter which can be connected to at least one battery bank, in which method the battery banks can be interconnected with one another in series and/or in parallel and at least one battery bank can be bridged, wherein, during autonomous operation of the motor vehicle, respective interconnection of the at least two battery banks is automatically carried out within the drive system, depending on a respective operating state of the motor vehicle which is established in association with operation. In this case, interconnection of the DC/DC converter is executed in such a way that, even after disconnection of at least one traction system and bridging of at least one battery bank, the DC/DC converter is or will be supplied with electrical energy by at least one remaining battery bank.

The autonomous operation of the motor vehicle relates, in particular, to autonomous driving in a stage 4, also called highly automated driving, and also stage 5, also called fully automatic driving. These stages provide that the motor vehicle performs independent operation largely without intervention by a driver. In this case, autonomous operation naturally comprises driving of the motor vehicle to a destination and operating states which respectively occur for this purpose, such as, for example, driving the motor vehicle or driving to a charging point and charging the battery banks.

In one embodiment of the method according to aspects of the invention, a high-voltage battery is formed by interconnecting the battery banks in series. A battery bank consists of a plurality of energy storage cells which are connected together and advantageously has a terminal voltage at the level of a charging voltage of a charging station, for example 400 V. A high driving power of an electric motor is advantageously achieved with a higher voltage, for example 800 V. This voltage can be achieved, for example, by connecting together two battery banks, each at 400 V, in series and constitutes a normal operating state of a high-voltage battery.

In one embodiment of the method according to aspects of the invention, the respective traction system is disconnected from the battery banks in terms of circuitry due to an occurrence of a fault in one of the at least two traction systems. If there is at least one further traction system, the at least one electric motor which is connected to it can continue to be operated by means of said further traction system and autonomous driving can be continued.

In a further embodiment of the method according to aspects of the invention, a pyro element and/or a semiconductor switch are/is selected as an electronic component for line interruption for disconnecting the respective traction system in terms of circuitry. Depending on the type of fault, it may be necessary to carry out the disconnection particularly rapidly in order to not cause damage to a battery bank, for example by an impending rapid discharge owing to a short circuit in a traction system. A pyro element or a semiconductor switch are particularly advantageous here.

In a yet further embodiment of the method according to aspects of the invention, when a fault occurs in a first battery bank, this battery bank is bridged and autonomous operation is continued with at least one second battery bank. A fault within a battery bank can be caused, for example, by the defect in an individual energy storage cell or by a breakdown of a battery bank controller which controls internal interconnection of the individual energy storage cells within a battery bank. If, for example, there are two battery banks, of which one is faulty, driving is continued with half the voltage in comparison to normal operation, and therefore also half the power, after bridging of the faulty battery bank by opening or closing switches which are provided in the interconnection arrangement for this purpose.

In one embodiment of the method according to aspects of the invention, a workshop which can be reached immediately is selected as a new destination of the autonomous operation for the purpose of clearing the fault. An occurrence of a fault in the drive system can have a limiting effect on the operation of the motor vehicle or, according to a prespecified measure catalogue, require an immediate visit to a workshop. In this case, autonomous driving in stages 4 or 5 provides that, when technical faults occur, the motor vehicle is either safely stopped or, if possible, driving is continued to a closest workshop.

In one embodiment of the method according to aspects of the invention, respective interconnection of the battery banks is carried out or made possible by at least one contactor. A contactor constitutes a reliable and proven switching element which advantageously does not require any cooling.

In a further embodiment of the method according to aspects of the invention, for the purpose of achieving a "battery charging" operating state, corresponding interconnection of the battery banks is autonomously selected in accordance with a provided charging voltage of a charging station, and a charging power is selected, which charging power results from a prespecified dimensioning of at least one electronic component which is used for the purpose of interconnection. In this case, the electronic component may be a switching element or a fuse.

An aspect of the invention further claims a system for autonomously electrically interconnecting at least two battery banks in a drive system of a motor vehicle, in which system the drive system comprises at least one electric motor, at least two battery banks, at least one traction system which can be supplied with electrical energy by at least one battery bank, and at least one DC/DC converter which can be connected to at least one battery bank, in which system the battery banks can be interconnected with one another in series and/or in parallel and at least one battery bank can be bridged, and in which system the drive system has a control device which is configured to carry out interconnection of the battery banks with one another and with the at least one traction system and the at least one DC/DC converter, wherein the system additionally comprises a control unit which is designed to execute autonomous operation of the motor vehicle, wherein the system is designed to execute a method as described above.

In a refinement of the system according to aspects of the invention, the system additionally comprises at least one pyro element and/or at least one semiconductor switch for the purpose of disconnecting at least one traction system from at least one battery bank in terms of circuitry.

BRIEF DESCRIPTION OF THE DRAWINGS

Further advantages and refinements the invention can be found in the description and the accompanying drawing.

It goes without saying that the features mentioned above and those still to be explained below can be used not only in the respectively indicated combination but also in other combinations or on their own, without departing from the scope of the present invention.

The FIGURE shows a schematic illustration of one embodiment of a circuit provided according to aspects of the invention having two battery banks.

DETAILED DESCRIPTION OF THE INVENTION

The FIGURE shows, by way of example, a schematic illustration of a drive system 100 provided according to aspects of the invention having two battery banks 102 and 104. The drive system 100 is controlled by a control device 162 which controls switches 112 and 114A-B and also 116A-B and 118A-B, which are contained in the dashed rectangles, and, in particular, rapid-action switch-off elements 192 and 194. The drive system 100 is connected to a first traction system 185A by means of a first connection 182 and to a second traction system 185B of the drive system 100 by means of a second connection 184. A DC/DC converter 173 is also connected to the connection 172, wherein the driver system 100 is designed in such a way that, irrespective of a switch position of the switches 116A-B and 118A-B, the connection 172 is connected to at least one battery bank 102, 104. When switches 116A-B are open, a charging process of at least one of the two battery banks 102 and 104 can therefore take place for example, by virtue of a connection of the charging station being brought into connection with the connection 172. The battery banks 102 and 104 can be interconnected with one another in series or with one another in parallel or individually bridged by means of switches 112 and 114A-B. A series circuit of the drive system 100 is realized when a switch 112 is closed and switches 114A-B are open, and a parallel circuit of the drive system 100 is realized when a switch 112 is open and switches 114A-B are closed. By way of example, when a fault occurs in one of the two battery banks 102 or 104, bridging of the battery bank 102 or 104 in question may be necessary. If battery bank 102 is to be bridged, this is achieved by opening the switch 112, interrupting a line 154 using switch 114B, wherein the other switch 114A establishes the connection of the battery bank 104 via a line 152 in the closed state. Analogously, bridging of the battery bank 104 is achieved by an opposing position of the switches 114A-B when switch 112 is open. A motor vehicle would continue to be able to be driven at half the power in both cases. A fuse 122 or 124 protects the respective battery bank 104 or 102 against excessively high current flow, wherein said current flow is measured by a current measuring device 132, for example, in a line 154. A measuring device 142 measures a power which is produced by the respective interconnection of the battery banks 102 and 104. The control device 162 receives signals 164 from a control unit, not shown here, which controls the autonomous operation of the motor vehicle, by means of a CAN bus for example. These signals 164 can report, for example, an occurrence of a fault in the first traction system 185A, as a result of which the control device 162 interrupts a connection of the battery banks 102 and 104 to the connection 182 by means of the rapid-action switch-off element 192. Analogously, a connection of the battery banks 102 and 104 to the connection 184 can be interrupted by the control device 162 by means of the rapid-action switch-off element 192 when a fault occurs in the second traction system 185B. If the connections between the two traction systems 185A-B and the battery banks 102 or 104 should be disconnected, the DC/DC converter 173 can nevertheless be supplied with power by means of connection 172 when switches 118A-B are closed.

What is claimed is:

1. A method for autonomously interconnecting a plurality of battery banks in a drive system of a motor vehicle, the method comprising:
    determining a respective operating state of the motor vehicle;
    during autonomous operation of the motor vehicle:
        respectively interconnecting the plurality of battery banks automatically within the drive system, depending on the determined respective operating state of the motor vehicle, wherein the drive system includes:
            at least one electric motor,
            the plurality of battery banks interconnected with one another in at least one of series or in parallel and at least one of the battery banks is bridged,
            a plurality of traction systems which are supplied with power by the battery banks,
            a DC/DC converter which is connected to the plurality of battery banks, and
            a plurality of pyro elements or semiconductor switches configured to electrically disconnect the plurality of traction systems from at least one of the battery banks;
        electrically disconnecting, via the at least one of the pyro elements or semiconductor switches, at least one of the traction systems from at least one of the battery banks; and
        when a fault occurs in both the plurality of traction systems, disconnecting the plurality of battery banks from the plurality of traction systems and continue to supply the DC-DC converter with power from the plurality of battery banks by closing at least one of the pyro elements or semiconductor switches.

2. The method as claimed in claim 1, further comprising interconnecting the battery banks in series to form a high-voltage battery.

3. The method as claimed in claim 1, wherein the plurality of battery banks include a first battery bank and a second battery banks, the method further comprising:
    bridging the first battery bank and continuing the autonomous operation with second battery banks when a fault occurs in the first battery bank.

4. The method as claimed in claim 1, further comprising selecting a workshop which is reached immediately as a new destination of the autonomous operation of the motor vehicle for the purpose of clearing the fault.

5. The method as claimed in claim 1, wherein the drive system includes at least one contactor and the step of respectively interconnecting the plurality of battery banks is carried out by switching the at least one contactor.

6. The method as claimed in claim 1, further comprising:
    selectively interconnecting the battery banks in accordance with a provided charging voltage of a charging station to achieve a battery charging operating state; and
    selecting a charging power resulting from a prespecified dimensioning of at least one electronic component used for interconnection.

7. A drive system comprising:
    at least one electric motor,
    a plurality of battery banks,
    a plurality of traction systems which are supplied with power by the battery banks,
    a DC/DC converter which is connected to the plurality of battery banks, and
    a plurality of pyro elements or semiconductor switches configured to electrically disconnect the plurality of traction systems from at least one of the battery banks;
    wherein:
        the battery banks are interconnected with one another at least one of in series or in parallel and at least one of the battery banks is bridged,
        the drive system has a control device which is configured to carry out interconnection of the battery banks with one another and with the plurality of traction systems and the DC/DC converter, and
        the drive system includes a control unit configured to execute autonomous operation of a motor vehicle, wherein the drive system is configured to:
        determine a respective operating state of the motor vehicle;
        during autonomous operation of the motor vehicle:
            respectively interconnect the plurality of battery banks automatically within the drive system, depending on the respective operating state of the motor vehicle;
            electrically disconnect, via at least one of the pyro elements or semiconductor switches, at least one of the traction systems from at least one of the battery banks; and
            when a fault occurs in both the plurality of traction systems, disconnect the plurality of battery banks from the plurality of traction systems and continue to supply the DC-DC converter with power from the plurality of battery banks by closing at least one of the pyro elements or semiconductor switches.

\* \* \* \* \*